Patented Feb. 28, 1939

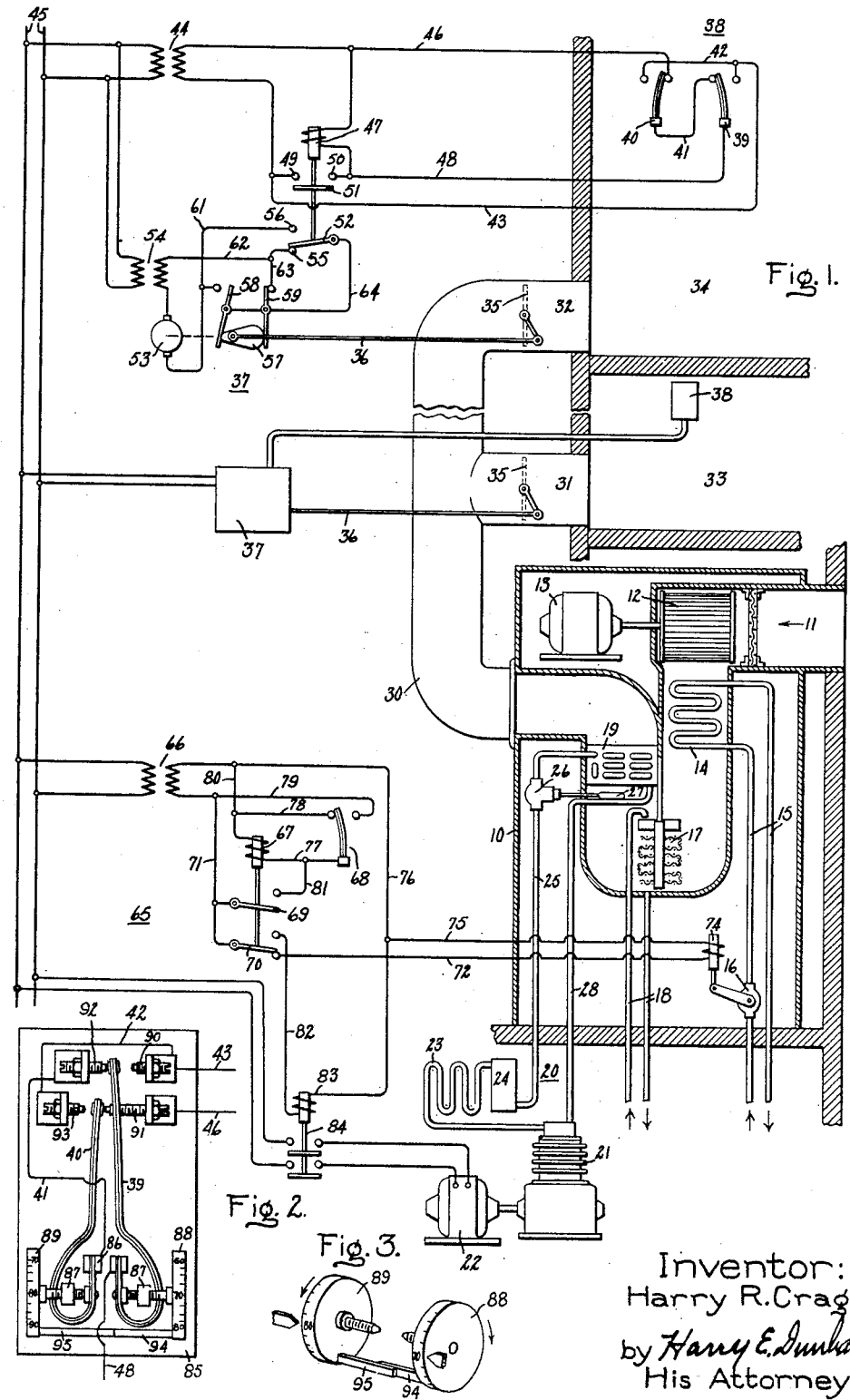

2,149,085

UNITED STATES PATENT OFFICE 2,149,085

REVERSIBLE THERMOSTATIC CONTROL SYSTEM

Harry R. Crago, Caldwell, N. J., assignor to General Electric Company, a corporation of New York Application March 21, 1936, Serial No. 70,007

6 Claims. (Cl. 236—1)

My invention relates to a reversible thermostatic control system.

An object of my invention is to provide an improved thermostatic control system that can be used for control of both heating and cooling in year round air conditioning service.

Heretofore it has been the practice to manually change the setting of a control thermostat so that in the summertime, when the space to be conditioned is cooled, the temperature therein would be maintained at a higher value than it would be in the winter time when the space was being heated. Manual operations are also required to change over from summer to winter control in the widely used central duct systems wherein individual room thermostats control the operation of dampers to regulate the flow of the heat exchange medium through branch ducts to the rooms. In this type of system it is necessary to reverse connections between the control thermostat and the damper actuating means so that the latter will open the damper in the winter time to allow the flow of heated medium when the temperature decreases below a predetermined minimum and in the summertime to allow the flow of cooled medium when the temperature rises above a predetermined maximum.

The present invention is an improvement of the inventions on which applications for Letters Patent were filed as follows: Serial No. 70,100 and Serial No. 70,099, both filed March 21, 1936, and assigned to the assignee of the present application. In the first of these applications there is disclosed a system utilizing a centrally located thermostat adapted to reverse the connections of thermostats located in the respective rooms to which the heat exchange medium is supplied. In the latter there is disclosed an improved form of device in which a unitary device comprising three thermal responsive means are utilized.

It is an object of my invention to provide a simplified control in which a unitary device in which only two thermal responsive means are required.

A further object of my invention is to provide means whereby the ranges in which thermostats operate may be adjusted within a predetermined distance from each other but are prevented from overlapping.

A more detailed understanding of the present invention may be secured from the following description taken in connection with the accompanying drawing in which is illustrated a preferred embodiment of the invention. Fig. 1 of the drawing illustrates a schematic diagram, partially in sectional elevation, of a conditioning system embodying my invention; Fig. 2 discloses a plan view of one form of my unitary thermostatic control device provided with means for preventing the thermal responsive means from operating in overlapping ranges, and Fig. 3 discloses a partial perspective view of Fig. 2.

The air conditioner 10 illustrated in the drawing may be of any conventional type but for purpose of illustration I have chosen the well-known type using a motor driven compressor for providing refrigeration and other means for heating and humidifying the air, as will be briefly described hereinafter. The conditioner is supplied with air through an inlet passage 11 extending without the walls of the conditioner proper. This supply of air may be either fresh air or a mixture of fresh and recirculated air and since both methods of supplying air to the conditioner are well-known to those skilled in the art I have not illustrated them. The supply of air is forced through the conditioner by means of a fan 12 driven by means of an electric motor 13. The motor may be supplied with energy from any suitable source (not shown) and may be energized constantly or intermittently as desired. The air is heated by means of a coil 14 supplied with steam from any suitable source through conduits 15, the inlet conduit being provided with any well-known type of solenoid operated valve 16. After passing by the heater the air is humidified by any desirable humidifying means illustrated by reference numeral 17 supplied with water through conduits 18. Thereafter the air passes by an evaporator 19 forming part of a familiar type of cooling system indicated generally by reference numeral 20.

The cooling system comprises a compressor 21 driven by means of an electric motor 22 supplied with energy from a suitable source in a manner to be described hereinafter. The compressed refrigerant passes through condenser coils 23 adapted to be cooled in any well-known manner (cooling means not shown). The condensed refrigerant is collected in the liquid receiver 24 and from thence the liquid passes to the evaporator 19 through conduit 25 under the control of the refrigerant valve 26 which is in turn controlled by the usual thermostatic bulb 27. After passing through the evaporator 19 the gaseous refrigerant passes to the compressor 21 through a conduit 28.

The air, after being conditioned, is circulated to any desired space such as a room, zone, or building which it is desired to condition, through a central duct 30 having individual branch ducts 31 and 32 leading to the separate spaces 33 and 34, respectively.

The regulation of the flow of conditioned air to the various spaces, of which I have illustrated but two, is under the control of dampers 35 positioned in each of the individual air ducts leading to the various spaces or rooms. The dampers are connected by means of crank arms 36 to actuating means indicated generally by reference numerals 37, which actuating means will be described more in detail hereinafter. The actuating means are in turn controlled by means of my improved thermostatic control systems, indicated generally at 38, positioned in the spaces to be conditioned. The thermostatic system is adapted to maintain the temperature of the rooms within a predetermined range in winter and a second predetermined range in summer in a manner also to be described more fully hereinafter.

The reversible thermostatic system positioned within the room consists of two thermal responsive elements, which I have illustrated as being of the well-known bimetallic type, indicated by reference numerals 39 and 40. These bimetallic elements are so positioned that they move toward the right as illustrated in Fig. 1 in response to a decrease in temperature. Consequently, the right-hand contact of the pair of contacts associated with each of elements 39 and 40 may be termed the "low" and the opposite contact, the "high" contact. The high contact of thermostat 39 is connected to thermal responsive element 40 by means of conductor 41. The low contact associated with element 39 is connected with the high contact associated with element 40 through conductor 42 and these are in turn connected by conductor 43 to the secondary winding of a transformer 44 through which the thermostatic system is provided with energy from a suitable source 45. The other terminal of the secondary winding of transformer 44 is connected to the low contact associated with element 40 by means of a conductor 46. It may be seen that if temperature conditions within the space 34 are such as to position the thermal responsive elements in the positions shown then they short circuit the relay 47 through conductors 46 and a conductor 48 leading from one terminal of the relay to element 39. It may be seen further that relay 47 will be energized if element 39 moves into engagement with its low contact on a decrease in temperature below a predetermined value or upon engagement of element 40 with its high contact upon an increase in temperature. Upon energization of relay 47 a holding circuit is established therefor by the closure of contacts 49 and 50 by bridging member 51.

Associated with the relay 47 is a second switch member 52 adapted to control the operation of the damper actuating means in a manner that will now be described. The damper 35 is connected by means of a crank arm 36 to the actuating means 37 comprising an electrical motor 53 adapted to receive energy from the supply 45 through a transformer 54. The energization of motor 53 to open and close the damper is effected by means of the switch element 52 and its cooperating contacts 55 and 56 in conjunction with a limit switch mechanism comprising cam 57 and movable switch members 58 and 59. Engagement of switch member 52 with contact 56 upon energization of relay 47 completes a circuit from contact 56 through conductor 61, motor 53, secondary winding of transformer 54, conductors 62 and 63, limit switch 59 and conductor 64 to switch member 52. Motor 53 thereupon operates to open damper 35 by means of a crank arm 36 while at the same time cam 57 is rotated. At the time damper 35 is in its fully open position the cam 57 is rotated 180° to open limit switch 59 and close limit switch 58 thereby deenergizing motor 53. Upon subsequent movement of switch member 52 from contact 56 to contact 55 upon deenergization of relay 47, a circuit is established from contact 55 through conductors 63 and 62, secondary winding of transformer 54, motor 53, conductor 61, limit switch 58 and conductor 64 to switch member 52, thereby energizing motor 53 to return damper 35 to its closed position. Cam 57 again rotates 180° opening limit switch 58 to deenergize motor 53 and closing limit switch 59 preparatory to the next energization of relay 47.

It will be understood that other well-known forms of control dampers may be employed if desired. This is particularly true if modulated control of damper 35 is desired and if such modulated control is deemed to be desirable the damper operating motor and control described may be modified in the manner shown in Letters Patent No. 1,902,327, Chester I. Hall, also assigned to the assignee of the present application.

In order selectively to obtain either heating or cooling of the air passing through the conditioner, I have provided a control indicated generally at 65. The control is energized through a transformer 66 connected to the source of power 45. A relay 67 is under the control of a thermal responsive device 68 suitably located at some central point of the building so as to be responsive to average temperature conditions. When the relay is deenergized under low temperature conditions, as indicated by Fig. 1, the air passing through the conditioner is heated and when the relay is energized the heating means is rendered ineffective and the cooling means is placed in operation. The relay operates a pair of switches 69 and 70, the former adapted to close a holding circuit for the relay and the latter controlling the operation of the heating and cooling means. Thus, as indicated in the figure, switch 70 is in its lower position thereby energizing a solenoid to open the valve 16 through a circuit that is as follows: from the secondary winding of transformer 66 through conductor 71, switch 70, and conductor 72 to the valve operating solenoid 74, and from thence back to the secondary winding through conductors 75 and 76. In this manner the heating means is rendered effective.

When the temperature of the space wherein the thermostat 68 is located rises then the bimetallic member moves to the right, first removing the short circuit across the relay formed by conductors 77 and 78 and then into engagement with its associated right hand contact. Thereupon relay 67 will be energized by closure of a circuit leading from the secondary of transformer 66 through conductor 79, bimetallic member 68, conductor 77, relay 67 and conductor 80 back to the secondary winding. Energization of the relay causes upward movement of its associated armature and the establishment of a holding circuit for the relay through electrical connection 81 and switch member 69. Simultaneously, switch member 70 is moved upwardly to close a circuit for the relay controlling the operation of the compressor motor 22 of the refrigerating appaatus. This circuit leads from one side of the transformer winding through electrical connection 71, switch 70, conductor 82 to the solenoid 83 and from thence back to the secondary winding through conductor 76. Upon energization of relay 83, its associated armature and switch member 84 are moved upward to connect compressor motor 22 directly across supply lines 45.

The operation of my system as a whole will now be described. For purpose of illustration I shall assume that it is desirable to maintain a minimum temperature of 70° within the spaces 33 and 34 in winter and that a maximum temperature of 80° is desirable in summer. Therefore, temperature responsive means 39 is arranged to move to the right into engagement with its right or low contact at a temperature of 70° and thermostat 40 arranged to move into engagement with its left hand or high contact at a temperature of 80°. It should be understood that these values are merely chosen for purpose of illustration and that the thermal responsive means may be calibrated to operate at any desired temperatures. It will be assumed also that the thermostats will operate with a temperature differential of 2° for purpose of illustration, but it is to be understood that this differential may differ in accordance with the characteristics of various thermostats. Consequently, the differential might be decreased to such a point that the thermostat might be considered as operable from one contact to the other at a particular value of temperature such, for example, as 70° or 80°.

It will be noted that if it is desirable to maintain a temperature of 70° indoors in winter the heating means of the air conditioning system must be placed in operation sometime prior to the time that a temperature of 70° obtains within the space and for the same reasons the cooling system must be placed in operation prior to the time that the temperature within the space to be conditioned rises to 80°. For this reason thermal responsive means 68 controlling the cooling and heating means of the air conditioner may be so selected that it will operate at a temperature of approximately 75°. That is, if the temperature is below 75° it will be in the position illustrated wherein the heating means is in operation and if the temperature is above 75° it will move to the right and energize the relay 83 controlling the operation of the cooling means.

Assuming that the temperature within spaces 33 and 34 is 73° and that the temperature outside said space and to which thermal responsive element 68 is responsive is also 73°, then the various parts of the system will be in the position illustrated in Fig. 1 of the drawing. Consequently, dampers 35 are in their closed position as relay 47 is deenergized and heating medium is supplied to the conditioner due to the energization of solenoid 74. If the temperature within the space 34 decreases to a value below 70°, then thermostat 39 will move into engagement with its right hand or low contact thereby closing an energizing circuit for relay 47 through conductors 46, relay 47, conductor 48, thermal responsive element 39 and conductor 43. Energization of relay 47 effects upward movement of its armature establishing a holding circuit for itself by closure of contacts 49 and 50 by bridging member 51. Simultaneously therewith, switch member 55 is moved into engagement with contact 56 thus effecting energization of motor 53 and causing actuation of damper 35 to its open position in a manner that has been heretofore described. Heated air is then supplied to space 34 through ducts 30 and 32.

The supply of heated air is continued until such time as the temperature of the space increases to a value of 72° (since it has been assumed that a differential of 2° is necessary to operate the thermostat) whereupon thermostat 39 moves to the left into engagement with its left hand or high contact to short circuit relay 47 through conductors 46, 41 and 48 in series with thermal responsive elements 39 and 40. The resultant deenergization of relay 47 effects downward movement of its associated armature and switch members 51 and 52, the former opening the relay holding circuit and the latter engaging contact 55 to close an energizing circuit for motor 53 which in turn actuates damper 35 to its closed position in a manner described above.

The above operation is repeated if the temperature within the space again falls below 70°. However, if the temperature rises to a value above 80° then thermostat 39 will be in engagement with its left contact and thermostat 40 will move into engagement with its left contact to close an energizing circuit for the relay 47 and the latter in turn will effect energization of motor 53 to actuate the damper 35 into its open position. The above mentioned assumed increase in temperature would also cause actuation of thermostat 68 to the right into engagement with its right hand or high contact thereby closing an energizing circuit for relay 67 as follows: from secondary winding of transformer 66 through conductor 79, thermal responsive element 68, conductor 77, relay 67 and conductor 80 back to the transformer. Energization of the relay effects closure of the relay holding circuit and also closure of the circuit controlling the energization of relay 83, the latter circuit extending from the transformer through conductor 71, switch member 70, conductor 82, relay 83 and conductor 76 back to the secondary of the transformer. In this manner the steam valve 16 is returned to its closed position by the deenergization of solenoid 74 and the compressor motor 72 is connected across the source of supply 48 by closure of switch 84 to initiate operation of the cooling apparatus. Consequently, the above mentioned opening of damper 35 now serves to allow the cooled air to be circulated into the space 34. The circulation of cooled air will continue until such time as the temperature within the space decreases to a value below 78° whereupon the relay 47 is short circuited with the result that switch member 52 engages contact 55 to again energize motor 53 to actuate the damper to its closed position.

To provide against the possibility of operation of both thermal responsive elements in the same range the thermostatic device may be constructed after the manner shown in Figs. 2 and 3. In Fig. 2 the device is shown mounted on a suitable base 85 made of insulating material. The base is provided with a pair of fixed supports 86 on which the thermal responsive elements 39 and 40 are mounted. The latter are mounted as in Fig. 1, that is, they are adapted to move to the right in response to a decrease in temperature and vice versa.

On the base are a second pair of supports 87 carrying adjusting means 88 and 89. These are provided with right hand screws and rotation of the former in a clockwise direction serves to increase the temperature range in which thermostat 39 operates while rotation of the latter in a clockwise direction serves to decrease the temperature range in which thermostat 40 operates.

Before describing the details of the means provided for preventing overlapping of the control I shall describe briefly the circuit connections. These are exactly the same as illustrated in Fig. 1 with the exception that the low contacts associated with the thermal elements 39 and 40 have been labeled with reference numerals 90 and 91 and the high contacts have been labeled 92 and 93.

The adjusting means 88 and 89 have been provided with a pair of interengaging arms 94 and 95, respectively, to prevent the adjustment of the thermostats to operate in the same temperature range. These arms limit the relative rotation of the adjusting elements.

In operation, it will be apparent from an inspection of Figs. 2 and 3, that rotation of members 88 and 89 in a clockwise direction, as indicated by the arrows, serves to raise the range of operation of thermostat 39 and to lower the range of operation of thermostat 40. The members 88 and 89 are illustrated as adjusted at 70° and 80°, respectively, and it is apparent that they cannot be adjusted to operate at temperatures nearer than 10° as their rotation to operate at nearer ranges is restricted by members 94 and 95. Obviously this range may be decreased or increased as desired.

The system described is adapted to various modifications and its advantages will be clearly apparent to those skilled in the art. It is obvious that various types of conditioning systems and damper operating means may be used and, in fact, that the flow of heat exchange medium may be through various types of ducts or pipes and under the control of regulating devices such as valves. It is to be understood that my invention in its broader aspects covers these modifications as well as the one specifically illustrated.

What I claim as new and desire to secure by Letters Patent of the United States is:

1. In combination, regulating means for controlling the flow of a heat exchange medium, means for actuating said regulating means, means including two thermal responsive devices each having associated therewith a high and low contact controlling the operation of said last named means for effecting operation of the latter in a single direction in response to variations in temperature in two directions, the first of said devices controlling said actuating means when the second is in engagement with its low contact, and the second controlling said actuating means when the first is in engagement with its high contact.

2. In combination, a control device, an energizing circuit therefor, a deenergizing circuit therefor, means for closing said energizing circuit when the temperature decreases below the lower limit of a first range or increases above the upper limit of a second range and for closing said deenergizing circuit when the temperature increases above the upper limit of said first mentioned range or decreases below the lower limit of the second mentioned range, said means including two thermal responsive means each operable from one control position to another within one of the above mentioned ranges, the thermal responsive means operable at the lower range being adapted directly to close said energizing circuit and to close said deenergizing circuit through the second thermal responsive means, and the second thermal responsive means being adapted to close both said circuits only when in series with said first thermal responsive means.

3. In combination, an electrical control device, a source of energy therefor, an energizing circuit therefor, a deenergizing circuit therefor, means including two thermal responsive elements each having associated therewith a high and low contact for controlling said circuits, an electrical connection between the low contact of one with the high contact of the second, a connection leading from said last mentioned connection to the source of energy, a connection from the high contact associated with said first element to the second element, a connection from the low contact of the second to the source of energy, and electrical connections leading from said control device to the source of energy and last-mentioned contact and to the first element, whereby said control device is energized when said first element is in contact with its low contact and when both said elements are in contact with their high contacts, and deenergized when the first is in contact with its high contact and the second with its low contact.

4. In a temperature regulating system, the combination of means for controlling the flow of heat exchange medium, and control means therefor including a pair of thermostats having series control connections for jointly effecting operation of said flow control means to decrease the flow of heat exchange medium when the temperature to be regulated is within a limited range, the control connection of each thermostat being rendered effective at a corresponding limit of said range and each of said thermostats having another control connection for effecting operation of said flow control means to increase the flow of heat exchange medium in response to variation of the temperature beyond the corresponding limit of said range.

5. In combination, a pair of separately operable thermostatic switches one operable from one circuit closing position to another circuit closing position upon a decrease in temperature below a predetermined lower limit and the other operable from one circuit closing position to another circuit closing position upon an increase in temperature above a predetermined upper limit, and an electrical control device having one control circuit connected to be closed jointly by said pair of thermostatic switches in said one circuit closing position thereof and having another circuit connected to be closed upon the separate operation of either of said thermostatic switches to the said other circuit closing position thereof.

6. In combination, electrically operated means for regulating the flow of heating and cooling medium and having one circuit for decreasing the flow upon closure thereof and another circuit for increasing the flow upon closure thereof, means for closing said one circuit including a heating control thermostat operable from one position to another position upon an increase in temperature above a predetermined lower limit and a cooling control thermostat operable from one position to another position upon a decrease in temperature below a predetermined upper limit, said heating and cooling control thermostats being connected in series to close said one circuit in said other positions thereof, connections whereby said heating control thermostat closes said other circuit upon operation thereof to said one position thereof independently of said cooling control thermostat, and connections whereby said cooling control thermostat closes said other circuit in said one position thereof in series circuit with said first thermostat in said other position thereof.

HARRY R. CRAGO.